United States Patent
Wang et al.

(10) Patent No.: US 6,945,741 B2
(45) Date of Patent: Sep. 20, 2005

(54) SYSTEM OF LASER POSITIONING OF AN APERTURE PROCESSING MACHINE

(75) Inventors: Winston Wang, Qingdao (CN); Jianjin Guo, Qingdao (CN)

(73) Assignee: Qingdao DayMaster Hardware & Tools Co. Ltd., Qingdao (CN)

( * ) Notice: Subject to any disclaimer, the term of this patent is extended or adjusted under 35 U.S.C. 154(b) by 333 days.

(21) Appl. No.: 10/285,965

(22) Filed: Nov. 1, 2002

(65) Prior Publication Data

US 2003/0095840 A1 May 22, 2003

(30) Foreign Application Priority Data

Nov. 20, 2001 (CN) ........................................ 01268601 U

(51) Int. Cl.⁷ .............................................. B23B 49/00
(52) U.S. Cl. ........................... 408/16; 408/13; 362/253; 362/259
(58) Field of Search ..................... 408/13, 16; 362/253, 362/259, 109, 119; 356/399; 33/286, 333, 334, DIG. 21, 638

(56) References Cited

U.S. PATENT DOCUMENTS

| | | | | |
|---|---|---|---|---|
| 5,522,683 A | * | 6/1996 | Kakimoto et al. | ............ 408/13 |
| 5,593,606 A | | 1/1997 | Owen et al. | |
| 5,741,096 A | * | 4/1998 | Olds | ......................... 408/1 R |
| 5,784,792 A | * | 7/1998 | Smith | ......................... 33/227 |
| 5,835,517 A | | 11/1998 | Jayaraman et al. | |
| 5,835,519 A | | 11/1998 | Tsukamoto et al. | |
| 6,023,071 A | * | 2/2000 | Ogura et al. | ................. 250/586 |
| 6,301,997 B1 | * | 10/2001 | Welte | ............................ 81/54 |
| 6,375,395 B1 | * | 4/2002 | Heintzeman | ................. 408/16 |
| 6,587,184 B2 | * | 7/2003 | Wursch et al. | ............. 356/4.01 |
| 6,763,597 B2 | * | 7/2004 | Lysen | .......................... 33/286 |
| 2004/0136796 A1 | * | 7/2004 | Chen | ........................... 408/16 |

* cited by examiner

Primary Examiner—Derris H. Banks
Assistant Examiner—J Williams
(74) Attorney, Agent, or Firm—Martine Penilla & Gencarella, LLP

(57) ABSTRACT

The present invention relates to a laser positioning system for an aperture-processing machine and is an accessory of an aperture-processing machine. The present invention is a type of laser positioning system for an aperture-processing machine that includes two laser transmission devices each of which emits a beam of light. The two light beams form an angular set up. A common line of intersection is formed at the point of intersection in space. After the two laser transmission devices have been fixed relative to the aperture-processing machine, the common line of intersection formed at the point of intersection of the two light beams mentioned above and the axial line of the main bearing cutter of the aperture-processing machine coincide exactly, thus forming the reference for positioning. In the application of the present invention, adjustment is easy, positioning is rapid and observation is direct with high accuracy and low cost. The device can be used widely in processing machines such as drilling machines, boring lathes and lathes.

4 Claims, 5 Drawing Sheets

SYSTEM OF LASER POSITIONING OF AN APERTURE PROCESSING MACHINE

BACKGROUND OF THE INVENTION

1. Field of the Invention

The present invention relates to an aperture-processing machine, and in particular, a system of laser positioning in an aperture-processing machine used for locating the position of the aperture that is being processed on a work piece accurately.

2. Description of the Prior Art

At present, when aperture-processing machines such as the drilling machine and lathe are used for aperture processing, in general, lines have to be drawn on the work piece to be processed beforehand. A centre bore is then made with a piercing mandrel before the aperture-processing machine is switched on for test drilling. Based on the result of test drill, the position of the work piece being processed is adjusted. This is repeated a number of times until the test drilled hole and the position of the centre bore are aligned before aperture processing is formally carried out. In the process, test drilling and adjustment of the position of the work piece being processed are usually repeated many times before an aperture with an acceptable position can be finalised. The adjustment is labour and time-consuming and easily leads to eye fatigue for the operating worker. Besides, it is difficult to guarantee the precision of the position of the aperture.

SUMMARY OF THE INVENTION

In order to overcome the existing technological shortcoming mentioned above, the present invention provides a type of main bearing cutter centre of the aperture-processing machine that is capable of accurately marking on the work piece being processed. The work piece to be processed can be moved easily so that the centre of the aperture to be processed coincides with the cutter centre. Positioning is accomplished rapidly with a high precision and efficiency. Besides, it is a laser positioning in an aperture-processing machine that can effectively reduce eye fatigue of the operating worker.

To achieve the above-mentioned objective, the solution provided by the present invention includes two laser-transmitting devices, each of which transmits a light beam. The two light beams become an angular set up. The point of their intersection in space forms a common line of intersection. After both laser-transmitting devices are fixed relative to the aperture-processing machine, the common line of intersection formed at the point of intersection of the two light beams mentioned above coincides precisely with the axial line of the cutter centre of the aperture-processing machine, forming the reference for positioning.

In the present invention, the light beams transmitted by the laser transmission devices mentioned above are planar. The relative vertical projection of the said planar beams is a fine, straight line. Therefore, the two planar beams should be very thin planes. When these two very thin planar beams intersect, the common line of intersection will also be a very fine, straight line. When the surface of the work piece intersects the said straight line, the projection is a very small light dot. As the said common line of intersection coincides with the axial line of the cutter, squaring operation is achieved merely by aligning the position of the centre bore of the work piece with the said light dot. Therefore, by using the system of laser positioning of the present invention, it will not be necessary to repeat test drilling several times when carrying out aperture processing. The processing is done after direct alignment.

A better way of applying the present invention is by fixing the two laser-transmitting devices on the spindle box of the aperture-processing machine, with its transmission end facing the side of the main bearing cutter. The two planar light beams produced by them are found within the space where the main bearing cutter is situated.

The said spindle box can be fixed with a chassis relative to the main axial symmetry. The laser transmitting devices are installed on the chassis.

There are holes on the fixed chassis. The laser transmission devices are installed in the holes on the fixed chassis. There are female threads or male threads at their tail end: A regulatory screw with corresponding male threads or female threads and protruded shoulder is fixed in the female or male threads. The regulatory screw and the laser transmission devices are clamped on the fixed chassis with the help of the screw threads.

The laser transmission devices mentioned in the present invention are pen-shaped. Usually it is possible to use a conventional pen-shaped laser transmitter. However, as the light beam generated by a conventional pen-shaped laser transmitter is usually a cylindrical beam, in the present invention, when the conventional laser transmitter that is capable of generating a cylindrical beam is used, a beam expander is installed at the transmission end of the laser transmitter. Through this beam expander, the cylindrical beam is expanded into a planar beam. This constitutes the laser transmission device mentioned in the present invention.

For example, the pen-shaped laser transmission device mentioned in the present invention may include a semiconductor-laser-diode type laser transmitter. Near the transmitting end of this semiconductor-laser-diode type laser transmitter, a beam expander is installed. This beam expander expands the cylindrical laser beam given out by the semiconductor-laser-diode type laser transmitter and the pen-shaped laser transmission device emits a planar beam from its transmission end.

The said beam expander is composed of a convex lens and a cylindrical lens. The convex lens and the cylindrical lens are set up along the line of axis of the cylindrical laser beam mentioned. The beam expander may also be composed of a convex lens and a corrugated lens. The convex lens and the corrugated lens are set up along the line of axis of the cylindrical laser beam mentioned or other forms of beam expander may be used to achieve the performance set by the present invention. Besides, the laser transmitter of the present invention can be other forms of laser transmitters.

When installing the present invention, it is necessary to adjust the position of installation of the two laser transmission devices. Firstly, the two planar beams generated by them must be able to form an angular set up to guarantee the production of a common line of intersection when they intersect in the space. The angle of the laser transmission device is further adjusted to finally bring about precise coincidence of the common line of intersection of the two planar beams and the main bearing cutter centre of the aperture-processing machine. Therefore, the position of the aperture being processed can be accurately determined with high precision and rapidity. The problem of several times of adjustment and testing is resolved.

In a preferred embodiment of the present invention, there are holes on the fixed chassis for installing the laser transmission device. The laser transmission device is pen-shaped, with female or male threads at its tail end. A regulatory screw with corresponding male threads or female threads and protruded shoulder is fixed in the female or male threads. The regulatory screw and the tail end of the laser transmission devices are clamped on the fixed chassis with the help of the screw threads.

Adjusting the laser transmission device of the present invention can be achieved as follows: When the regulatory screw is loosened, the laser transmission devices can be made to revolve on the fixed chassis together with the regulatory screw until the line of intersection produced by the intersecting fine, straight-line light beams from both the left and right laser transmission devices coincides precisely with the main bearing cutter centre of the aperture-processing machine. The laser transmission devices are then fixed by hand until they stop moving. The regulatory screw is then turned tight. Upon completion of adjustment, the intersecting line that is in precise coincidence with the main bearing cutter centre is perpendicular to the operating platform. Regardless of the height of the work piece, the centre marked on the work piece will always be the cutter centre. Processing can be done clearly and precisely. Based on the theory of adjustment of the present invention, it is also possible to use other regulatory structures and not restricted to the use of a regulatory screw of the present invention.

The present invention has the advantages of rapidity, accuracy, low cost and ease of use. It can be used widely in processing machines such as drilling machines, lathes and boring lathes.

DETAILED DESCRIPTION OF THE PREFERRED EMBODIMENT

Preferred Embodiment 1

Figure 5:
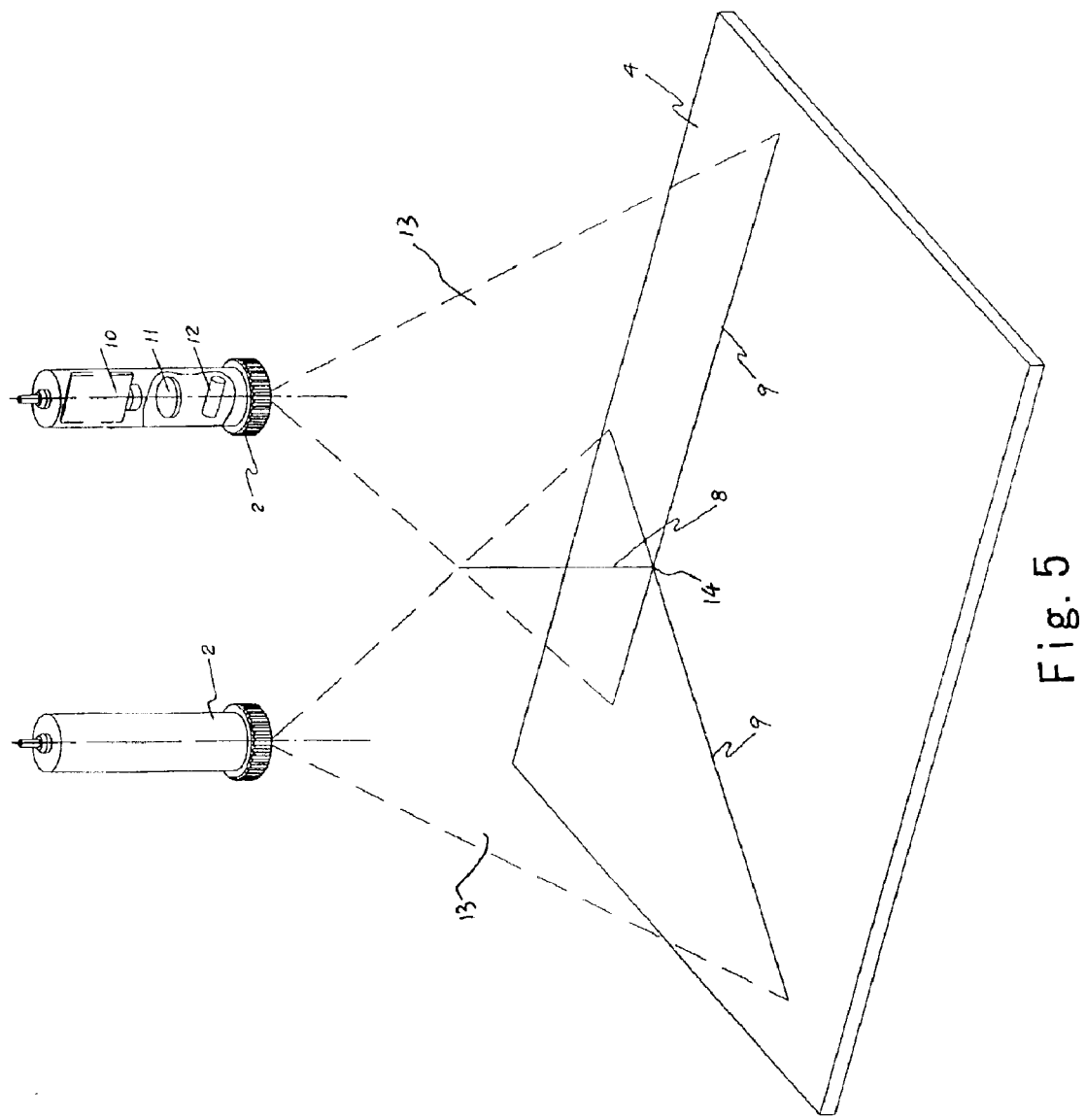
FIG. 5 is a schematic view showing the optical theory of the present invention.

The present invention is a type of system of laser positioning of an aperture-processing machine. As shown in FIG. 5, there are two laser transmission devices (2). Each laser transmission device (2) emits a light beam (13). The two light beams (13) form an angular set up. Their point of intersection in space forms a common line of intersection (8). After both laser transmitting devices (2) are fixed relative to the aperture-processing machine, the common line of intersection (8) formed at the point of intersection of the two light beams (13) mentioned above coincides exactly with the axial line of the cutter centre of the aperture-processing machine, forming the point of reference for positioning.

In the present invention, the light beams (13) transmitted by the laser transmission devices (2) mentioned above are planar. The relative vertical projection of the said planar beam (13) is a fine, straight line (9). Therefore, the two planar beams (13) should be a very thin plane. When these two very thin planar beams (13) intersect, the common line of intersection (8) will also be a very fine, straight line. When the surface of the work piece intersects the said straight line, the projection is a very small light dot (14). As the said common line of intersection (8) coincides with the axial line of the cutter, squaring operation is achieved merely by aligning the position of the centre bore of the work piece with the said light dot (14). Therefore, by using the system of laser positioning of the present invention, it will not be necessary to repeat test drilling several times when carrying out aperture processing. The processing is done after direct alignment. As the above-mentioned light point (14) is situated at an arbitrary height on the common line of intersection (8), the present invention is applicable to a work piece at an arbitrary height.

Figure 1:
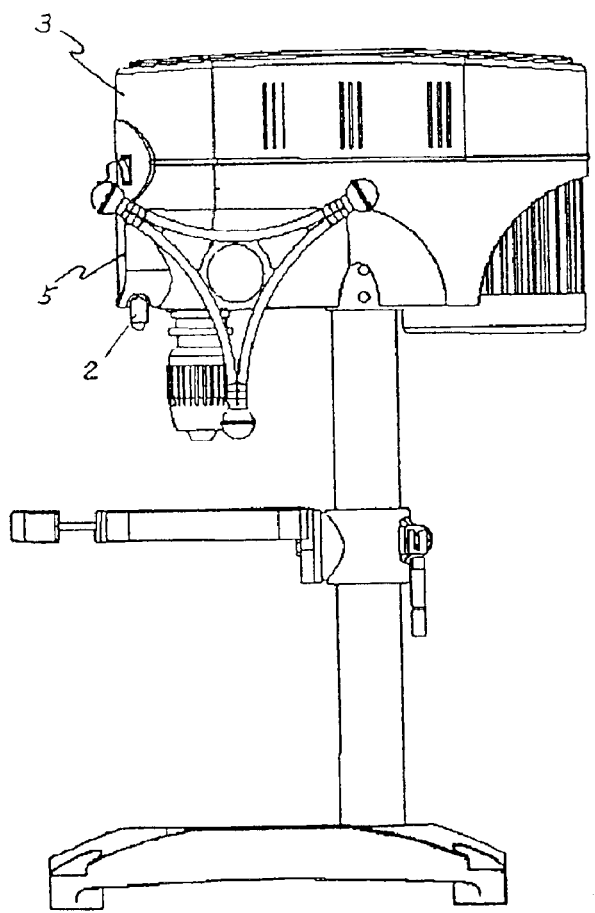
FIG. 1 is a schematic view showing the installation of the present invention.
Figure 2:
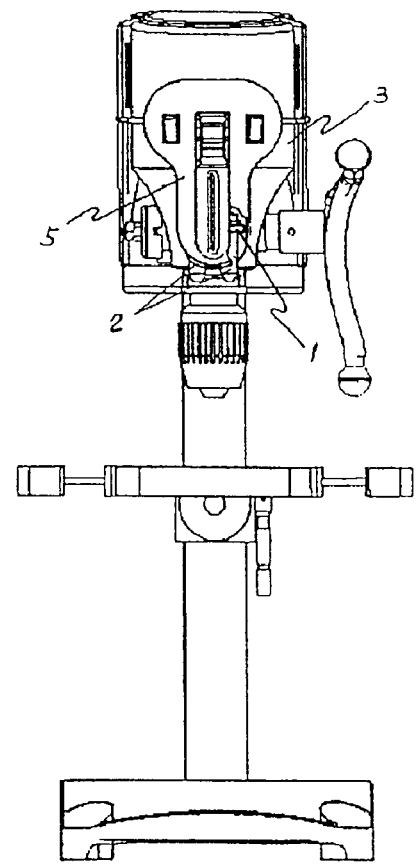
FIG. 2 is the lateral view of FIG. 1 in accordance with the present invention.

As shown in FIG. 1 and FIG. 2, the present invention should be installed relative to the aperture-processing machine. In the present preferred embodiment, the aperture-processing machine is a type of drill machine. The system of positioning in the present invention can be fixed and linked to a spindle box (3). In the present preferred embodiment, two fixed chassises (1) can be installed on the spindle box (3) relative to the main axis symmetry. The laser transmission devices in the present invention are installed on the said fixed chassis (1). The transmitting end of the said laser transmission devices (2) face the side of the main bearing cutter. In this way, the light beams (13) emitted will fall within the space where the main bearing cutter is.

When installing the present invention, it is necessary to adjust the position of installation of the two laser transmission devices (2). Firstly, the two planar beams (13) generated by them must be able to form an angular set up to guarantee the production of a common line of intersection when they intersect in the space. The angle of the laser transmission device (2) is further adjusted to bring about precise coincidence of the common line of intersection (8) of the two planar beams (13) and the main bearing cutter centre of the aperture-processing machines. Therefore, the position of the aperture being processed can be accurately determined with high precision and rapidity. The problem of several times of adjustment and testing is resolved.

Figure 4:
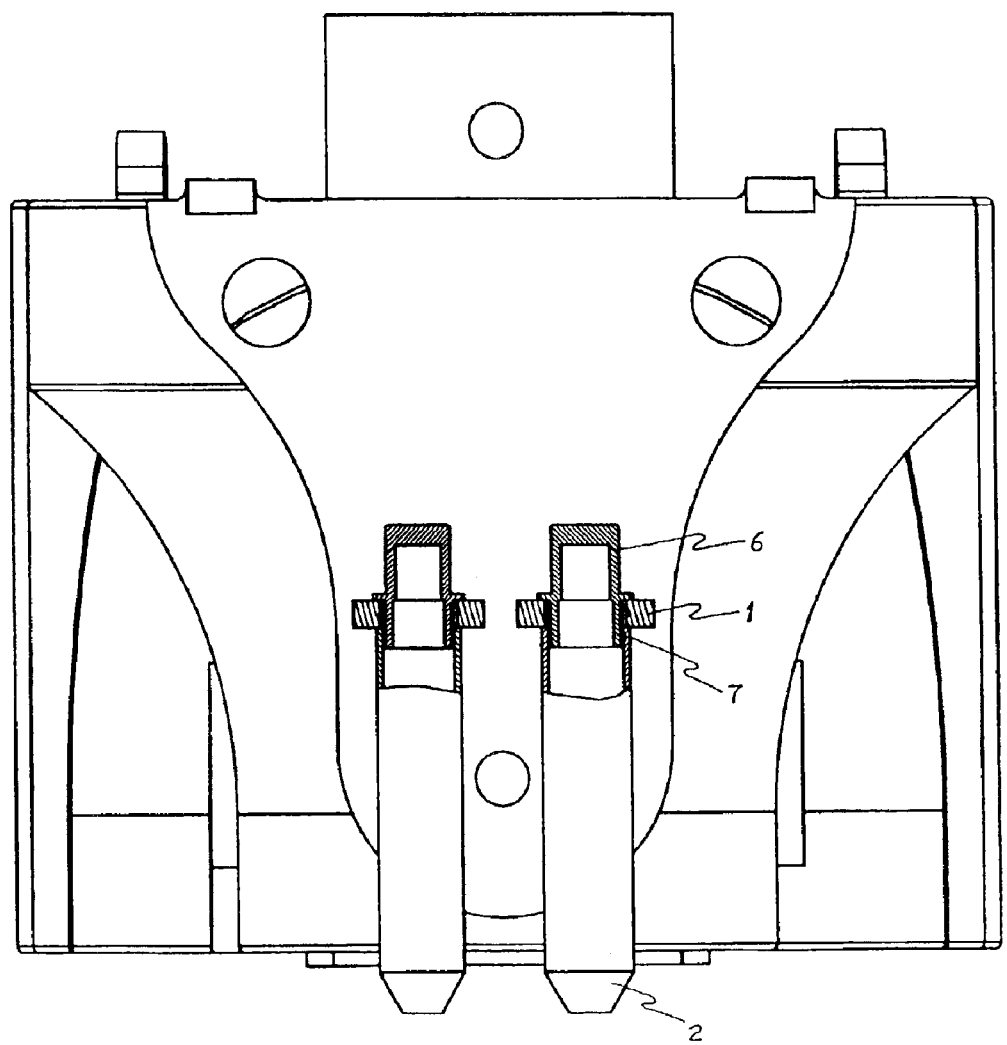
FIG. 4 is a schematic view showing the structure of the present invention.

As shown in FIG. 4, there are holes on the fixed chassis (1). Each laser transmission device (2) is installed in the hole of the fixed chassis (1). The tail end of the device has female threads or male threads (7). A regulatory screw (6) with corresponding male threads or female threads and a protruding shoulder is installed in the female or male threads (7). The regulatory screw (6) and the laser transmission devices (2) are clamped on the chassises (1) with the help of the screw threads. FIG. 4 shows the dismounted front cover of the spindle box (3) of the aperture-processing machine. The tail end of the laser transmission device (2) and the regulatory screw (6) are clamped on the fixed chassis (1), tightened by the female and male threads (7). By loosening the regulatory screw (6), the angle of its axial plane can be adjusted along its axial line, thus adjusting the direction and position of the two planar light beams.

Figure 3:
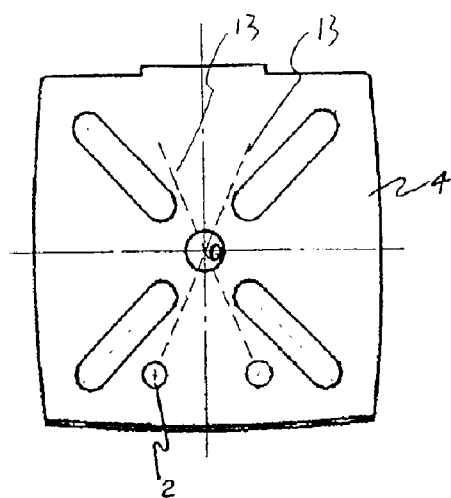
FIG. 3 is a schematic view showing the principle of operation in accordance with the present invention.

The theory of the present invention is shown in FIG. 3. The light planes emitted by the laser transmission devices (2), that is, the position of installation of the axial plane along its axial line has an angle of intersection. The devices are located above the working platform of the aperture-processing machine. The two light planes intersect the operating platform, forming a fine, straight-line laser light (9) respectively. The two fine, straight-line laser light (9) have a light spot of intersection on the operating platform. The light spot is on the 0 spot on the central line of the main bearing cutter. This is also the centre of the hole to be processed on the work piece.

Figure 6:
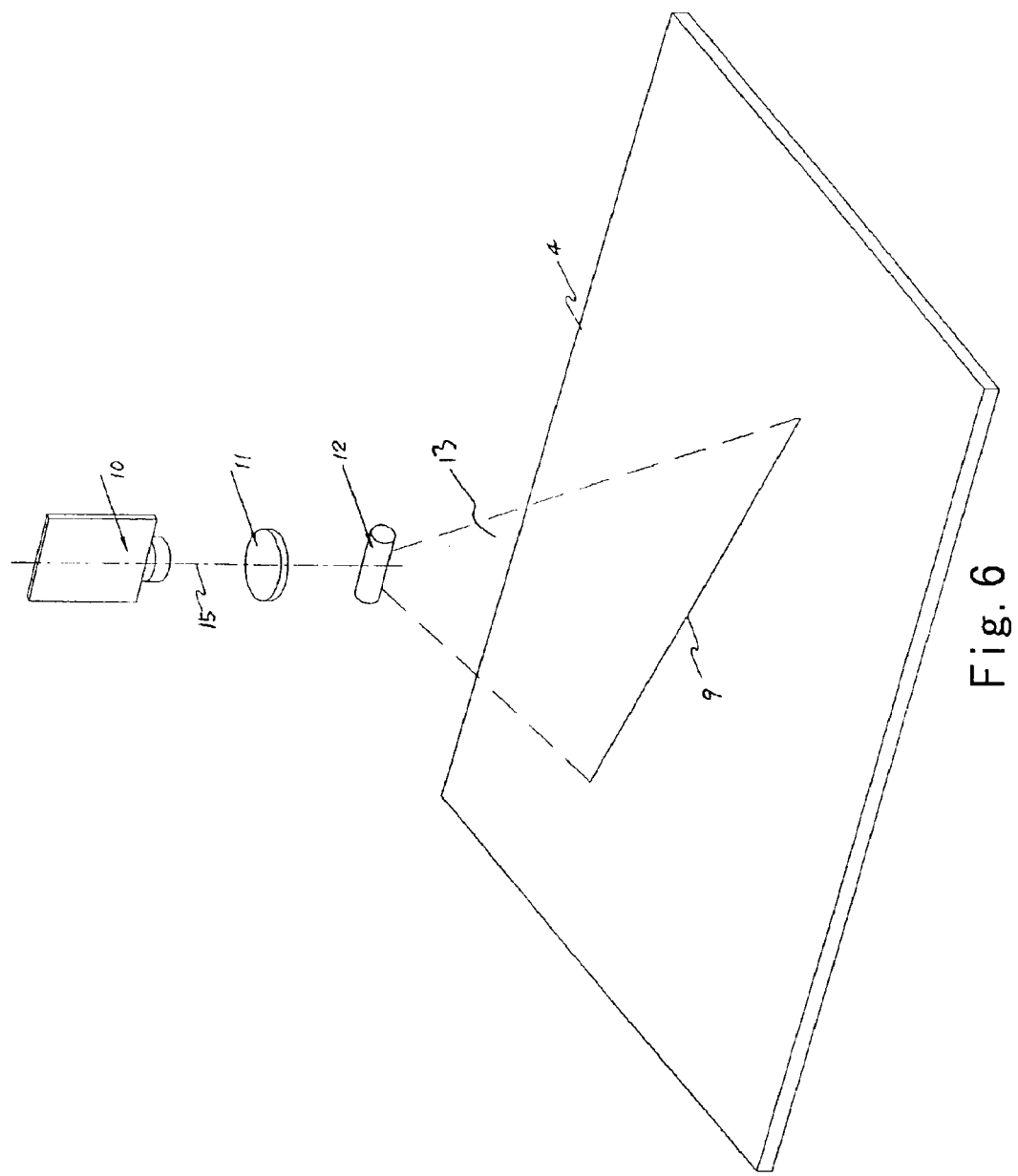
FIG. 6 is a schematic diagram showing the laser transmission device in accordance with the present invention.

As shown in FIG. 6, in the present preferred embodiment, a type of laser transmission equipment (10) made of a semiconductor laser diode tube is used. It is able to transmit an extremely fine, cylindrical beam of light (15). On the same axis as the cylindrical light beam (15), a beam expander is installed. In the present preferred embodiment, the beam expander mentioned is composed of a convex lens (11) and a cylindrical lens (12). The convex (11) lens and cylindrical lens (12) are installed along the axial line of the cylindrical laser beam mentioned above. After penetrating the set of beam expander, the said cylindrical light beam (15) is expanded to become a planar light beam (13) for emission.

When using the present invention, the regulatory screw (6) is loosened. The laser transmission devices can be made to revolve on the fixed chassis together with the regulatory screw (6) until the common line of intersection (8) of the planar light beams emitted by both the left and right laser transmission devices (13) coincides precisely with the central line of the main bearing cutter of the aperture-processing machine. The laser transmission devices are then fixed by hand until they stop moving. The regulatory screw is then turned tight. Regardless of the height of the work piece, the centre of the aperture to be drilled marked on the work piece will always be on the central line of the cutter. It is obvious and accurate during processing.

In the present preferred embodiment, it is also possible to achieve the regulation of position of the plane of the light beams (13) by adjusting the angle of the cylindrical lens (12) and the cylindrical laser beam (15), thus adjusting the common line of intersection (8) of the light beam planes and the axial line of the main bearing cutter of the said aperture-processing machine so that they coincide exactly, forming the point of reference for positioning.

In the present preferred embodiment, the aperture-processing machine can also be a boring lathe.

In the course of application of the present invention, adjustment is easy, positioning is rapid and observation is direct with high accuracy and low cost. It can be used widely in processing machines such as drilling machines, boring lathes and lathes.

Preferred Embodiment 2

Figure 7:
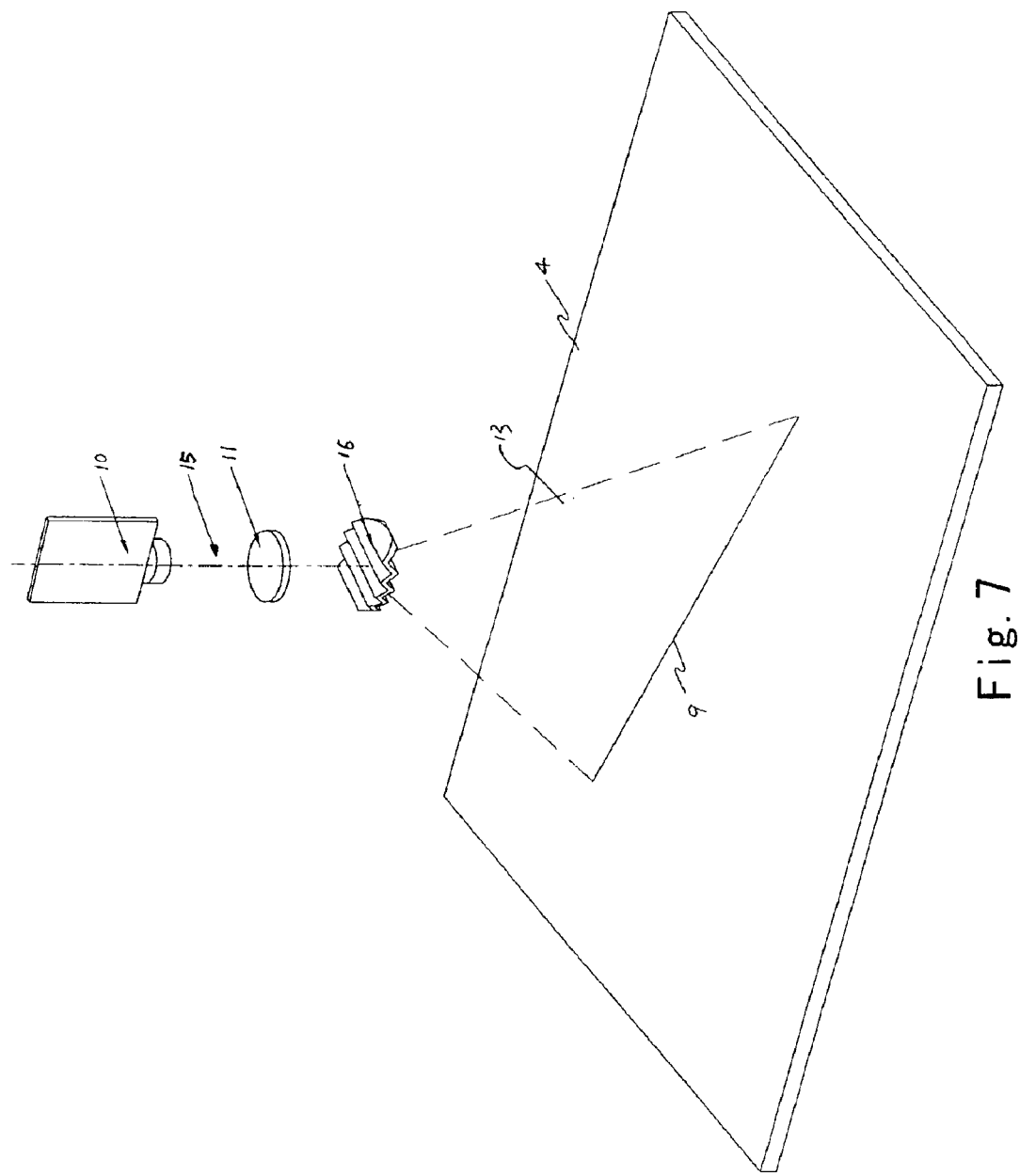
FIG. 7 is a schematic view showing another preferred embodiment of a laser transmission device in accordance with the present invention.

As shown in FIG. 7, the difference between the present example and the above-mentioned example lies in the fact that the said laser transmission device (2) can be composed of a semiconductor-laser-diode-type laser transmitter (10) and beam expander. The beam expander can be composed of a convex lens (11) and a corrugated lens (16). The convex lens (11) and the corrugated lens (16) are set up along the axial line of the cylindrical laser beam mentioned. The semiconductor-laser-diode-type laser transmitter (10) can emit an extremely fine cylindrical beam (15). After penetrating through the said beam expander, this cylindrical beam (15) is expanded to become a planar light beam (13) and emitted.

In the present preferred embodiment, it is possible to adjust the position of the planar light beam (13) by the way described in the preferred embodiment 1. The adjustment of position of the plane of the light beam (13) can also be achieved through the regulation of the angle of the corrugated lens (16) and the cylindrical laser light beam (15), thus adjusting the common line of intersection (8) of the light beam planes and the axial line of the main bearing cutter of the said aperture-processing machine so that they coincide exactly, forming the point of reference for positioning.

The basic structure, principle and effects of the present preferred embodiment are the same as those for application example 1 and will not be repeated here.

Having described the invention in detail, those skilled in the art will appreciate that modifications may be made of this invention without departing from its spirit. Therefore, it is not intended to limit the present invention only to the preferred embodiments illustrated and described. Rather, the scope of the invention is to be determined by the appended claims and their equivalents.

What is claimed is:

1. A system of laser positioning for an aperture-processing machine, the system comprising two laser transmission devices fixed to a spindle box of the aperture-processing machine and disposed at a same side of a main bearing cutter, a transmitting end of each of the two laser transmission devices facing a side of the main bearing cutter, and a central axial line of the two laser transmission devices being constantly kept parallel to an axial line of the main bearing cutter of the aperture-processing machine, wherein each of the two laser transmission devices transmits a light beam, with the two light beams being formed into an angle, and a point of intersection in space of the two light beams forms a common line of intersection, and wherein when each of the two laser transmission devices is fixed with respect to the aperture-processing machine, the common line of intersection formed at the point of intersection in space of the two light beams coincides exactly with the axial line of the main bearing cutter of the aperture-processing machine, and thus forms a reference for positioning.

2. The system of claim 1, wherein the light beams emitted by the two laser transmission devices are planar and a relative vertical projection of the planar light beams is a fine, straight line.

3. The system of claim 1, wherein the spindle box has two fixed chassis relative to a main axis of symmetry, and the two laser transmission devices are respectively installed on the two fixed chassis.

4. The system of claim 3, wherein each of the fixed chassis is provided with holes and the two laser transmission devices are installed in the holes of the fixed chassis, wherein each of two laser transmission devices has female threads or male threads thereon and a regulatory screw with corresponding male threads or female threads and a protruded shoulder is installed within the female or male threads of each of the two laser transmission devices, and wherein the regulatory screws and the two laser transmission devices are clamped on the fixed chassis with the help of the threads.

\* \* \* \* \*